United States Patent
Van Beersel

[19]

[11] Patent Number: 6,059,908
[45] Date of Patent: May 9, 2000

[54] METHOD FOR PROTECTING SUBSTRATES

[75] Inventor: Jozef Van Beersel, Temse, Belgium

[73] Assignee: NV Raychem SA, Kessel-Lo, Belgium

[21] Appl. No.: 08/995,295

[22] Filed: Dec. 19, 1997

Related U.S. Application Data

[62] Division of application No. 08/635,932, filed as application No. PCT/GB94/02361, Oct. 27, 1994, Pat. No. 5,700,530.

[30] Foreign Application Priority Data

Oct. 27, 1993 [GB] United Kingdom .................... 9322092

[51] Int. Cl.[7] .............................. B32B 01/08; B32B 31/24
[52] U.S. Cl. .......................... 156/86; 156/187; 156/273.9; 156/275.5; 156/275.7; 138/144
[58] Field of Search .......................... 156/86, 187, 272.2, 156/273.9, 274.4, 274.6, 274.8, 275.5, 275.7, 308.2, 309.6, 85; 138/144; 428/416, 465, 466

[56] References Cited

U.S. PATENT DOCUMENTS

| | | |
|---|---|---|
| 2,027,962 | 1/1936 | Currie .......................................... 18/55 |
| 3,086,242 | 4/1963 | Cook et al. ................................... 18/1 |
| 3,502,492 | 3/1970 | Spiller ....................................... 117/17 |
| 3,597,372 | 8/1971 | Cook ........................................... 260/4 |
| 3,874,418 | 4/1975 | Hielema .................................... 138/144 |
| 4,213,486 | 7/1980 | Samour et al. ........................... 138/143 |
| 4,287,034 | 9/1981 | Pieslak et al. ............................ 204/147 |
| 4,372,796 | 2/1983 | Greuel, Jr. ................................ 156/187 |
| 4,510,007 | 4/1985 | Stucke ................................. 156/244.12 |
| 4,732,632 | 3/1988 | Pieslak et al. ............................. 156/86 |
| 4,791,966 | 12/1988 | Eilentropp ................................ 138/154 |
| 4,802,509 | 2/1989 | Brandolf .................................. 138/110 |
| 4,806,400 | 2/1989 | Sancaktar ................................ 428/35.9 |
| 4,866,252 | 9/1989 | Van Loo et al. .......................... 219/535 |
| 4,910,059 | 3/1990 | Sancaktar ................................... 428/47 |
| 4,961,798 | 10/1990 | Hart et al. .................................. 156/86 |
| 4,965,119 | 10/1990 | Sancaktar ................................. 428/192 |
| 5,026,451 | 6/1991 | Trzecieski et al. ................. 156/244.27 |
| 5,300,356 | 4/1994 | Dempster et al. ........................ 428/220 |
| 5,482,087 | 1/1996 | Overbergh et al. ...................... 138/110 |
| 5,720,834 | 2/1998 | Steele et al. ............................... 156/86 |

FOREIGN PATENT DOCUMENTS

| | | |
|---|---|---|
| 0611915 | 8/1994 | European Pat. Off. . |
| 2502288 | 9/1982 | France . |
| 57-144721 | 9/1982 | Japan . |
| 60-92830 | 5/1985 | Japan . |
| 61-59095 | 3/1986 | Japan . |
| 1-280530 | 11/1989 | Japan . |
| 3-244527 | 10/1991 | Japan . |
| 4-7124 | 1/1992 | Japan . |
| 4-118219 | 4/1992 | Japan . |
| 261724 | 11/1927 | United Kingdom . |
| 1105830 | 3/1968 | United Kingdom . |
| WO 92/08073 | 5/1992 | WIPO . |

OTHER PUBLICATIONS

British Search Report for Application No. GB 9322092.9, Jan. 27, 1993.
International Search Report for Application No. PCT/GB94/02361, Jan. 30. 1995.

*Primary Examiner*—Michael W. Ball
*Assistant Examiner*—Michael A. Tolin
*Attorney, Agent, or Firm*—Marguerite E. Gerstner

[57] ABSTRACT

A tape covering for elongate substrates such as metal pipes is provided. At least one edge of the tape is chamfered. and in preferred embodiments the angle of the chamfer is no greater than 25° especially no greater than 7°. In other preferred embodiments the tape comprises a backing layer and an adhesive layer, both of which preferably include a chamfered edge, the chamfer preferably extending through both the backing layer and the adhesive layer. The tape is preferably heat recoverable, and the adhesive, if present, heat activatable. The tape may be installed according to a preferred method of the invention using induction heating, preferably at such high frequency that the ratio of the thickness of the substrate to the skin depth is at least 25:1.

11 Claims, 2 Drawing Sheets

METHOD FOR PROTECTING SUBSTRATES

REFERENCE TO RELATED APPLICATIONS

This application is a divisional of U.S. Application Ser. No. 08/635,932, filed Apr. 25, 1996, now U.S. Pat. No. 5,700,530, which was the National Stage of International Application No. PCT/GB94/02361, filed Oct. 27, 1994, the disclosure of which is incorporated herein by reference.

BACKGROUND OF THE INVENTION

1. Field of the Invention

This invention relates to an article for providing a protective covering to a substrate and to methods of applying and securing such an article to a substrate.

2. Introduction to the Invention

Structures such as, for example, supports, e.g. for oil rigs or piers, and pipes commonly require protection from mechanical abuse and corrosion. It is well known to provide such protection by providing a protective covering, e.g. a sleeve or tape on the structure. In order to provide an effective and reliable protective covering it is often necessary to apply the covering in the factory prior to installation of the structure. However, with time, such coverings fail to maintain their protection due to mechanical abuse, e.g. soil stresses or wave battering, poor resistance to heat or cold and/or moisture, and poor initial application of the covering. When failure of the covering occurs it is normally necessary to remove the original covering and apply a new covering to the structure. In addition, when pipes are connected, e.g. welded, together it is normally necessary to apply a protective covering to the exposed pipe joint.

It is often difficult to apply an effective and long-lasting protective covering to a structure that is in its operational location. This may be partly due to the difficulty of ensuring that the covering is applied to the structure without defects and partly due to the fact that conditions in the field often prevent the use of equipment or techniques that may be used in the factory.

One successful method of applying a protective covering to a structure, e.g. a pipeline, in the field is disclosed in European Patent Application No. 0181233, the entire disclosure of which is incorporated herein by reference. This method comprises coating the pipeline with a liquid curable polymeric primer, e.g. an epoxy resin, and then applying one or more polymeric layers, e.g. a tape or sleeve, the innermost layer of which is capable of interacting with the curable polymeric primer in order to form a secure attachment to the structure. The method has the advantage that it does not require the high temperatures and complex equipment needed in some previous coating methods, notably the so-called 'fusion-bonded epoxy' methods, for example as disclosed in U.S. Pat. Nos. 4,213,486, 4,510,007 and 3,502,492.

SUMMARY OF THE INVENTION

According to a first aspect of the present invention, there is provided a tape for providing a protective covering to an elongate substrate by being wrapped around the substrate in an overlapping manner, wherein at least one edge of the tape extending in the direction of wrapping is chamfered in order to alleviate the existence of voids at the overlap.

According to a second aspect of the invention, there is provided a method of applying to an elongate substrate a tape according to the invention, which comprises wrapping the tape around the substrate in an overlapping manner so that the or each overlapping edge of the tape is in intimate contact with at least part of the chamfer of the respectively overlapped edge of tape.

According to a third aspect of the invention, there is provided a method of securing an article to a substrate, wherein the article comprises a heat-activatable composition, preferably an adhesive, the method comprising placing the article in thermal contact with the substrate and heating the substrate by induction, i.e. by applying a high frequency alternating magnetic field thereto, such that skin effect induction heating of the substrate heats the composition and the article is thereby secured to the substrate.

DETAILED DESCRIPTION OF THE INVENTION

The first and second aspects of the invention solve, or at least alleviate, a problem associated with wrapping tapes (the term 'tape' is used herein to mean tape, sheet or wraparound sleeve) around substrates such that a tape-to-tape overlap is present, namely the presence of a gap or void between the tape and the substrate at the overlap. The presence of such a gap or void, and particularly the presence of air in the gap or void, may lead to water or moisture ingress and consequent corrosion of the substrate if metal, e.g., if a metal pipe it may also lead to poor securement of the tape to the substrate, so that mechanical abuse, e.g. due to soil stresses, of the tape over time may dislodge the tape from the substrate.

As mentioned above, the tape according to the invention has at least one edge which is chamfered, which is intended to mean that the edge is substantially not at 90° to the major surfaces of the tape, in contrast to conventional 'straight-cut' tapes which have edges which are substantially perpendicular to their major surfaces. The angle of chamfer, that is to say the acute angle between one major surface of the tape and the chamfered edge of the tape may be, for example no greater than 25° or 20°. It is preferably no greater than 10°, more preferably no greater than 7°, especially no greater than 5°. Typical values of the angle of chamfer are between 2°50' and 4°50', e.g. 3°30' or 4°15'. The preferred angle of chamfer often depends on the flexibility and thickness of the tape, since a relatively thin and flexible tape will not normally require as shallow an angle of chamfer as a relatively thick and inflexible tape, in order to alleviate the existence of voids at the overlap. The tape preferably has a thickness of at least 1 mm, preferably at least 1.3 mm and preferably no greater than 5 mm, more preferably no greater than 2.5 mm, e.g. about 1.6 mm or 1.9 mm. A typical width of chamfer of the tape is about 2 to 3 cm. The chamfered edge of the tape may be substantially planar or it may be concave or convex for example. Preferably the chamfer is arranged such that it is located on the outside of the tape when the tape is wrapped around the substrate. Alternatively, however, the chamfer may be arranged such that it is located on the inside of the tape when the tape is wrapped around the substrate, in which case the tape is preferably sufficiently flexible that, at least when the tape is wrapped around the substrate, the chamfer conforms to the outer surface of the substrate, producing a taper on the outside of the tape which has substantially the same effect as a chamfer.

Preferably the tape is chamfered on only one of its edges extending in the direction of wrapping. By 'the direction of wrapping' is meant the direction in which the tape is wrapped or wound around the elongate substrate. In a preferred embodiment of the invention, the tape is wrapped around the elongate substrate such that with each winding the tape traverses along part of the length of the substrate. When the substrate has a substantially circular cross-section, e.g. when the substrate comprises a pipe, such wrapping is preferably substantially helical. When the tape is wrapped in this way, in an overlapping manner, successive windings or wrappings of the tape around the substrate overlap the chamfered edge of the previous winding or wrapping of the tape. Alternatively, however, in another preferred embodiment of the invention, particularly when relatively short lengths of the substrate need to be covered, the tape is wrapped around the substrate in discrete overlapping sections. When wrapped in this way, in an overlapping manner, each discrete section of the tape is preferably wrapped at least once around the substrate substantially without any axial traverse along the substrate and each successive discrete section overlaps the chamfered edge of the previous section of tape.

The width of the tape, i.e. the dimension parallel to the major surfaces of the tape substantially perpendicular to the direction of wrapping of the tape may be chosen to suit particular requirements, but for many applications the tape is preferably no more than 2 meters wide, more preferably no more than 1 meter wide, e.g. 90 cm wide, especially when the tape is wrapped around the substrate in discrete overlapping sections. The tape may be significantly narrower than 90 cm wide, e.g. 50 cm or 30 cm, especially when the tape is helically wrapped around the substrate. Preferably, the amount of overlap is at least 20 mm, more preferably at least 30 mm.

According to a preferred embodiment of the invention, the tape comprises a backing layer and an adhesive layer. The backing layer preferably comprises a polyolefin, e.g. polyethylene or polypropylene; acrylic rubber; EPDM; nitrile rubber; nylon; epichlorohydrin elastomer; polysulfhide; acrylic elastomer; butyl rubber or the like. Particularly preferred is cross-linked polyethylene.

The adhesive layer preferably comprises a heat-activatable adhesive, e.g. a hot melt adhesive. The hot melt adhesive can be any sealant typically used to bond corrosion protection coatings to metal and particularly those generally used to bond a coating to a pipeline which is cathodically protected (e.g. impressed current or sacrificial anode) to protect the pipeline from corrosion, abrasion or impact damage, etc. Such hot melt adhesives include those based on thermoplastic polyamides, polyolefins, polyesters, polyurethanes, polysulfides and the like. Especially preferred are polyamide or ethylene terpolymer-based hot melt adhesives. Particularly preferred are hot melt adhesives containing ethylene co- or terpolymers, for example co- or terpolymers of ethylene with one or more of vinyl acetate, maleic anhydride, acrylic acid, methacrylic acid or alkyl acrylate such as ethyl acrylate. Various additives may be included in the hot melt adhesive as desired such as waxes, rubbers, stabilizers and the like. Other examples of additives are disclosed in U.S. Pat. Nos. 4,455,204 and 4,287,034 incorporated herein by reference.

Another suitable adhesive is that described in International Patent Publication No. WO-92/08073. This adhesive comprises a blend of an essentially amorphous thermoplastic resin and an uncured thermosetting resin, and preferably also a curing agent. The thermosetting resin in this adhesive preferably comprises an epoxy resin and the curing agent is preferably selected from the group consisting of isophthaloyl dihydrazide, benzenephenone tetracarboxylic dianhydride, diethyltoluene diamine, 3,5-dimethylthio-2,4-toluene diamine, dicyandiamide, substituted imidazoles, diaminodiphenyl sulphone, substituted ureas, substituted dicyandiamides, solid polyamides, solid aromatic amines, solid anhydrides, pyromellitic dianhydride, phenolic resin hardeners, poly(p-hydroxystyrene), imidazoles, 2-pheny-4, 5-dihydroxymethylimidazole and 2,4-diamino-6[2'-methlyimidazolyl-(1)] ethyl-s-triazine isocyanate adduct, boron trifluoride:amine complexes, trially 1 isocyanurate, triallyl cyanurate, trimethylol propane triacrylate, peroxide, and tributlyl-tin-dilaurate. A curing accelerator such as a substituted urea or an imidazole is preferably also included. The amorphous thermoplastic resin is preferably selected from the group consisting of polysulphones, polyethersulphones, polystyrene, polyphenylene oxide, amorphous polyamides, phenoxy resins, amorphous polyimides, polyetherimides, polyetherimide/silicone block copolymers, polyurethanes, amorphous polyesters, polycarbonates, acrylic resins, polymethyl methacrylate, styrene/acrylonitrile and styrene block copolymers, and (ii) a thermosetting resin selected from the group consisting of epoxy resins, polyurethanes, bismaleimide resins, unsaturated polyesters, triallyl isocyanurate, triallyl cyanurate, and trimethylol propane triacrylate.

A further suitable adhesive is that described in U.S. Ser. No. 212,632, filed Mar. 11, 1994 (Raychem Corporation-Rinde et al) now abandoned in favor of a continuation application, Application Ser. No. 08/615,746, filed Mar. 13, 1996. This adhesive composition is a curable polymeric composition which is a liquid at 20° C., and which comprises (1) 25 to 60% by weight of a resin component which comprises an epoxy; (2) 5 to 25% by weight of a curing agent which comprises (a) a first component which is a cycloaliphatic amine or an aromatic amine [e.g. 4,4'-methylene-bis-(2-ethyl-6-methylcydohexylamine), 1,3-diaminocydoohexane, isophorone diamine, methane diamine, 4,4'-methylene-bis-(2,6-diethylaniline), 4,4'methylene-bis-(2-isopropyl-6-methylaniline), 4,4'methylene-bis-(2,2-diisopropylaniline), 4,4'-methylene dianiline, m-phenylene-diamine, and 4,4' methylene-bis-(2-ethyl-6-methylaniline) and blends of these amines] and (b) a second component which is a polyamide amine, e.g a hot melt adhesive, and (3) 20 to 65% by weight of an inert inorganic filler. The curing agent preferably further comprises a third component which is a tertiary amine, and/or preferably further comprises a Bronsted base. Preferably the epoxy comprises a bisphenol A epoxy resin, or a novolak epoxy, or blends thereof. Particularly preferred is a modified epoxy which is a mixture of a bisphenol A diglycidyl ether polymer and approximately 10% of a multifunctional resin based on 4-glycidyloxy-N-N-diglycidyl aniline. The inorganic filler preferably comprises barium sulphate, lithopone, titanium dioxide, mica, or a mixture thereof. The filler preferably has an average particle size of less than 5 microns. The stoichiometric ratio of the epoxy to the curing agent is preferably in the range of 1/0.8 to 1/1.5, especially 1/1. The composition preferably has a flash point of more than 60° C.

A particularly preferred embodiment of the invention is one in which the chamfer of the tape extends through both the backing layer and the adhesive layer. That is, preferably both the backing layer and the adhesive include a chamfer, and most preferably the chamfered edge is continuous across the boundary between the backing layer and the adhesive.

In a preferred embodiment in which an adhesive is used, the adhesive layer preferably includes cut out regions or indents, e.g. in the form of grooves or channels or other-shaped cut out regions. The purpose of these cut out regions or indents is to provide a channel for the escape of air. Where, for example, the tape, with such an adhesive layer, is helically wrapped, so that adjacent turns overlap, around a heated substrate, the adhesive in direct contact with the substrate will heat and melt and flow first. The adhesive in the overlap region, which is spaced from the substrate will melt and flow later. Where the tape is heat-recoverable, especially heat-shrinkable, as described below, the cut out regions, e.g. grooves, allow any air to escape from the overlap region before the adhesive in the overlap region melts and flows. This adhesive layer design minimizes the possibility of void formation in the overlap region. It consequently increases the speed at which tape wrapping can be carried out, and avoids the need to apply pressure, e.g. by roller at the overlap region.

The tape according to the first aspect of the invention is preferably heat-recoverable. Heat-recoverable articles are well known and comprise articles that have a dimensional configuration that may be made substantially to change when subjected to heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, heat-recoverable articles are made from a polymeric material exhibiting the property of elastic or plastic memory as described, for example, in U.S. Pat. Nos. 2,027,962, 3,086,242 and 3,597,372. As is made clear in, for example U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate state.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is heat-unstable. Application of heat will cause the article to assume its original heat-unstable shape.

As mentioned above, the method according to the second aspect of the invention comprises wrapping the tape around a substrate in an overlapping manner so that the or each overlapping edge of the tape is in intimate contact with at least part of the chamfer of the respectively overlapped edge of tape. When the tape according to the invention comprises an outer backing layer and an inner heat-activatable adhesive layer, the method preferably further comprises heating the tape in order to activate the adhesive, thereby securing the tape to the substrate.

Preferably the or each overlapping edge of the tape forms an abutment and part of the adhesive, when heated, exudes out of the overlap to form a fillet adjacent to the abutment.

In a particularly preferred method according to the invention, a curable polymeric composition is applied to the substrate, so that the adhesive layer is placed in intimate contact with the curable polymeric composition when the tape is wrapped around the substrate, and the curable polymeric composition is allowed to cure while it is in intimate contact with the adhesive layer, thereby enhancing the securement of the tape to the substrate. Preferably, during installation, the adhesive is liquid when in contact with the curable polymeric composition, or is preferably at least starting to melt.

The curable polymeric composition preferably comprises a resin component, a curing agent and optionally a Bronsted base, preferably in excess. The resin component is preferably a liquid at 20° C. The curing agent also is preferably a liquid at 20° C. A solvent may be present in the curable composition but preferred curable compositions contain little or no solvent. In general, no more than about 20% by weight of the composition should comprise solvent, preferably no more than about 5% and most preferably the composition is solvent-free.

The resin component of the curable composition preferably comprises a thermosetting resin, for example a liquid epoxy resin, such as bisphenol A epoxies, novolak epoxies, 1,2-epoxies, or coal tar epoxies, prepolymer precursors of polyurethanes and/or coal tar urethanes, polyesters (unsaturated and alkyl), acrylates, polyimides, silicones, etc.

The curable polymeric composition also preferably comprises a curing agent for the resin component. The curing agent is selected such that under the conditions of application the resin selected will be cured to a substantial extent within the desired time period. In preferred embodiments, the resin component comprises an epoxy resin and the curing agent may be a catalytic curing agent, a reactive curing agent or mixtures thereof. Examples of catalytic curing agents are anionic catalysts such as metal alkoxides, isocyanurates or more preferably materials containing free amine groups. Preferred catalytic curing agents are tertiary amines, for example, pyridine, 2,4,6-tris (dimethylaminomethyl) phenol, dimethylaminopropyl amine, benzyldimethyl amine, triethyl amine or 1-methyl imidazole; or secondary amines, for example, piperidine, diethanol amine or imidazole. Examples of reactive curing agents include polyamides (for example, Versamid polyamides from Henkel), polyamines, for example ethylene diamine, ethylene triamine, diethylene triamine, or triethylene tetramine, and adducts of the above polyamides and polyamines or similar amines, for example the adduct of polyamide with a bisphenol A epoxy resin. Other catalysts useful in combination with reactive curing agents include phenolic compositions such as phenol, bisphenol A, catechol, resorsinol and other compounds containing hydroxy groups.

When the tape according to the invention is heat-recoverable, the tape is preferably heated after having been wrapped around the substrate, thereby causing the tape to recover.

According to a third aspect of the invention, there is provided a method of securing an article to a substrate, wherein the article comprises a heat-activatable composition, preferably an adhesive, the method comprising placing the article in thermal contact with the substrate and heating the substrate by induction, i.e. by applying a high frequency alternating magnetic field thereto, such that skin effect induction heating of the substrate heats the composition and the article is thereby secured to the substrate. Placing the article in thermal contact with the substrate includes placing the article in direct physical contact with the substrate and placing the article in contact with one or more layers which are in physical contact with the substrate such that heat transfer occurs between the substrate and the article.

The skin effect is a well-known effect in induction heating, wherein induced alternating currents (eddy currents) in a conductive substrate are not uniformly distributed over the cross-section of the substrate but are denser towards the outer surface of the substrate. A convenient concept is that of 'skin depth' which is defined as the depth below the surface of a conductor at which current density is reduced to 1/e times its value at the surface of the conductor (where e is the base of the natural logarithm, i.e. about 2.718). The theoretical skin depth d in a right cylindrical solid bar is given by the expression:

$$d=k(f\mu T)^{-1/2}$$

where d is the depth in meters, f is the frequency of applied alternating field in Hz, $\mu$ is the relative permeability of the substrate (dimensionless), T is the conductivity of the substrate in mhos/meter and K is a geometrical constant.

The method according to the third aspect of the invention has a number of advantages. Using high frequency induction heating to heat the substrate such that the heat is concentrated in an outer layer, portion or 'skin' of the substrate, means that energy normally does not have to be used to heat the entire substrate in order to heat the article. This can be extremely important, especially when the substrate otherwise acts as an effective heat-sink, for example when the substrate comprises a metal pipe, e.g. a steel pipe. A fluid-carrying conduit, e.g. an oil pipe or a water pipe, may act as a particularly effective heat-sink when fluid is flowing through the pipe. However, by using the method according to the third aspect of the invention an article may normally be secured to a pipe while the pipe is in operation, e.g. carrying oil or water, since use of the skin effect substantially avoids the necessity of having to put enough heat energy into the pipe to heat the entire thickness of the pipe wall and also therefore substantially prevents the fluid carrying the heat away. The method according to the invention therefore normally avoids the extremely costly practice of shutting down the pipeline operation in order to coat the pipe. In addition, pipes commonly have an internal coating which may be damaged by heat: using the skin effect to heat only an outer skin of the pipe substantially reduces the risk of damaging such an internal coating of the pipe. Another advantage of the method according to the third aspect of the invention is that since the heating of the article occurs from the surface of the substrate, e.g. outwardly from the pipe surface to the surface of the article in thermal contact with the pipe surface (the 'internal surface' of the article), it is normally not necessary to heat the entire thickness of the article in order to activate the composition, e.g. adhesive of the internal surface of the article, and importantly, the method substantially ensures that heat is provided to that part of the article (its internal surface) that most needs the heat in order for the article to be secured to the substrate.

A further advantage of the method according to the third aspect of the invention is that the heating of the article is normally a very fast operation. Because high frequency induction heating is used and therefore only enough energy to heat an outer skin of the substrate is required, the composition will normally be heated sufficiently to be activated after less than a minute of heating, e.g. less than thirty seconds or even less than ten seconds and typically five or six seconds.

Preferably, the ratio of the thickness of the substrate to the skin depth is at least 25:1, more preferably at least 40:1, even more preferably at least 60:1, most preferably at least 100:1, especially at least 120:1. This is preferred since, as stated above, concentrating the heating of the substrate in an outer 'skin' normally means that energy does not have to be used to heat the entire thickness of the substrate in order to heat the article. When the substrate comprises a pipe, the thickness of the substrate comprises the thickness of the pipe wall. The method may, for example, be used to cover pipes having a wall thickness between about 0.5 cm and 4 cm, typically about 1.25 cm. Preferably the skin depth is no greater than 0.5 mm, more preferably no greater than 0.3 mm, especially no greater than 0.2 mm, even more preferably no greater than 0.15 mm, e.g. 0.1 mm. The skin depth in a steel pipe when heated by induction at a frequency of 15–20 kHz is typically about 0.1 mm, compared to a skin depth of about 5 mm when heated at a frequency of 400 Hz.

The induction heating of the substrate may be due to one or both of two well known mechanisms, namely Joule heating and magnetic hysterisis losses. The first of these is the sole mechanism of heat generation in nonmagnetic materials (e.g. aluminum, copper, austenitic stainless steels, and carbon steels above the Curie temperature) and the primary mechanism in ferromagnetic metals (e.g. carbon steels below the Curie temperature). The second mechanism is the mechanism of heat generation in ferrimagnetic materials, such as ferrites.

Preferably, the frequency of induction heating is at least 11 kHz, more preferably at least 13 kHz, especially at least 15 kHz, and most preferably at least 17 kHz. For some applications, the preferred frequency range is between 15 and 30 kHz, typically about 20 kHz. However, for other applications the frequency may be much higher, e.g. 100 or 200 kHz, or even 500 kHz. The actual frequency used depends on the particular circumstances and requirements and the materials of the substrate and the article. The upper limit of the frequency range will often be determined by electrical safety issues, or by cost, or by the physical characteristics of the induction heating apparatus used.

In contrast, induction heating of pipelines has hitherto typically been carried out at frequencies of about 400–800 Hz.

In a preferred method according to the invention, the article is placed in contact with the substrate such that it substantially surrounds at least part of the substrate, and preferably the article comprises a sleeve or tape that is positioned or wrapped around the substrate. More preferably the article comprises a backing layer for the heat-activatable composition.

The article may comprise the tape according to the first aspect of the invention as described above either including the chamfered edge(s) or not including the chamfered edge (s). Preferably, however, the article comprises the tape according to the invention (i.e. including the chamfered edge(s)). Securing the tape according to the first aspect of the invention by the method according to the third aspect of the invention has the advantage that the substantial non-existence of voids in the wrapped tape allows substantial conformity of the adhesive of the tape with the outer surface of the substrate. This has the effect that the adhesive may be effectively heated by heat energy emitted from the substrate, even at the overlap points of the wrapped tape, producing a secure and reliable protective covering.

In a particularly preferred method according to the third aspect of the invention, a curable polymeric composition as described above, is applied to the substrate prior to placing the article in contact with the substrate, so that the heat-activatable adhesive is placed in intimate contact with curable polymeric composition when the article is applied to the substrate, and the curable polymeric composition is allowed to cure while it is in intimate contact with the heat-activatable adhesive, thereby enhancing the securement of the article to the substrate.

Advantageously, the substrate may be heated prior to application of the article and the curable polymeric composition thereto, in order to remove moisture from the substrate. The article may, for example, be a heat-recoverable article, as described above.

It will be appreciated that all of the aspects of the invention may advantageously be combined to provide a system for providing a protective covering to a substrate, e.g. a metal pipeline. For example, a pipeline that requires a protective covering to be applied to it may first be prepared by being pre-heated to drive any moisture from its outer surface (e.g. by a gas torch). A curable liquid primer composition may then be applied to the dry surface of the pipe, for example by spraying. The two-layer (backing plus adhesive) tape according to the invention may then be helically wrapped around the pipe on top of the curable primer. Subsequent to wrapping the tape around the pipe, the hot-melt adhesive of the tape and the curable primer may be heated by means of high frequency (e.g. 20 kHz) induction heating of an outer skin of the pipe. The heat transferred from the outer skin of the pipe to the primer and the adhesive preferably activates the adhesive and cures the primer (which is in contact with the adhesive) so that the primer and the adhesive interact to form a secure bond to the pipe. The tape may advantageously be heat-recoverable, and the induction heating may have caused some recovery of the tape. In addition, a post-heating of the tape may be carried out, e.g. by infrared heating, to cause the tape to recover and/or to ensure a good tape-to-tape bond at the overlap.

BRIEF DESCRIPTION OF THE DRAWINGS

The invention will now be described by way of example with reference to the accompanying drawings, in which.

DETAILED DESCRIPTION OF THE DRAWINGS

Figure 1:
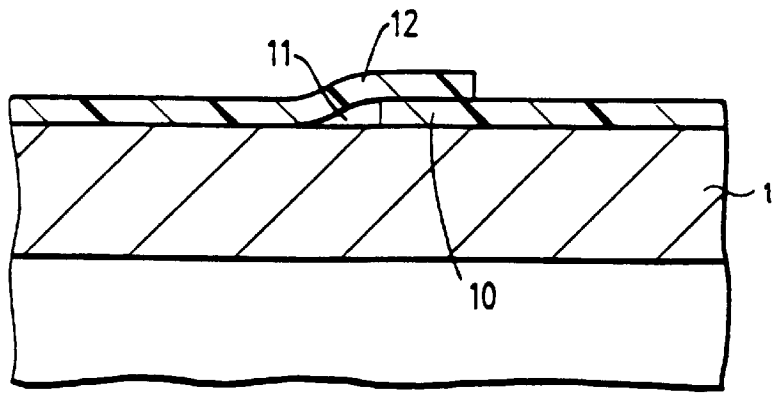
FIG. 1 shows in detail an overlap of a conventional tape wrapped around a pipe.

FIG. 1 shows in detail an overlap of a conventional (prior art) straight-cut tape wrapped around a pipe 1. Because the overlapped edge 10 of the tape is not chamfered, a void 11 is present under the overlapping portion 12 of the tape.

Figure 2:
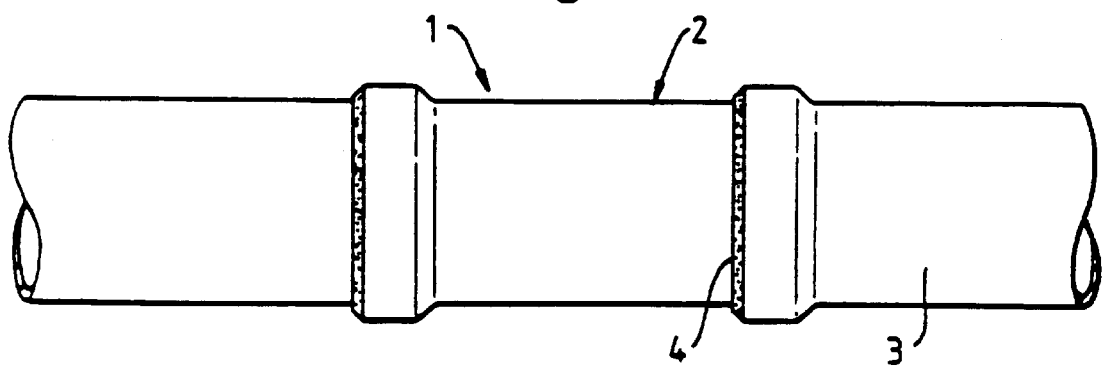
FIG. 2 shows a pipe wrapped in overlapping discrete sections of tape according to the invention.

FIG. 2 shows a steel pipe 1 wrapped in discrete overlapping sections of tape 2 according to the invention. The tape comprises a backing layer 3 of high density polyethylene and an adhesive layer 4 of ethylene vinyl acetate hot-melt adhesive that is shown partly exuded out of each overlap of the tape to form a fillet.

Figure 3:
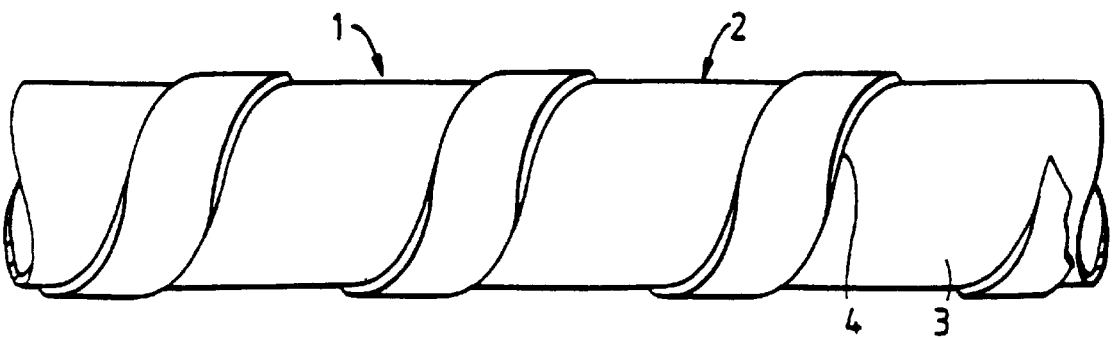
FIG. 3 shows a pipe covered in a helically wrapped tape according to the invention.

FIG. 3 shows a steel pipe 1 helically wrapped in a tape 2 according to the invention. The fillet of the exuded adhesive 4 is shown extending helically along the length of the pipe.

Figure 4:
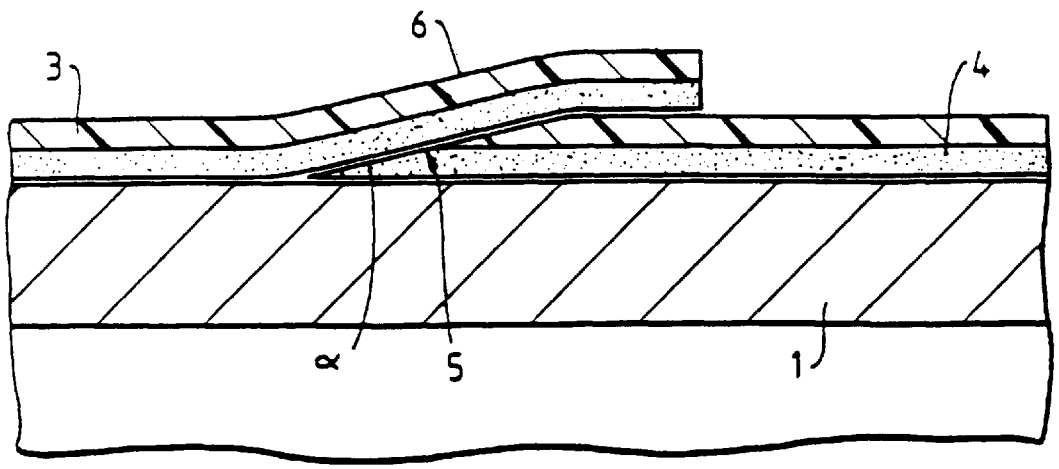
FIG. 4 shows in detail an overlap of the wrapped tape of FIGS. 2 and 3 prior to heating the tape.

FIG. 4 shows in cross-section a detail of an overlap of the wrapped tape of FIGS. 2 and 3 prior to heating the tape. The chamfered edge 5 of the tape is shown extending through both the outer backing layer 3 and the inner adhesive layer 4, and the chamfered edge is overlapped by the overlapping portion 6. It can be seen that the overlapping portion 6 of the tape is substantially able to conform to the chamfer of the overlapped portion so that substantially no void is present. The angle a of chamfer is shown larger than is preferred in reality, for clarity.

Figure 5:
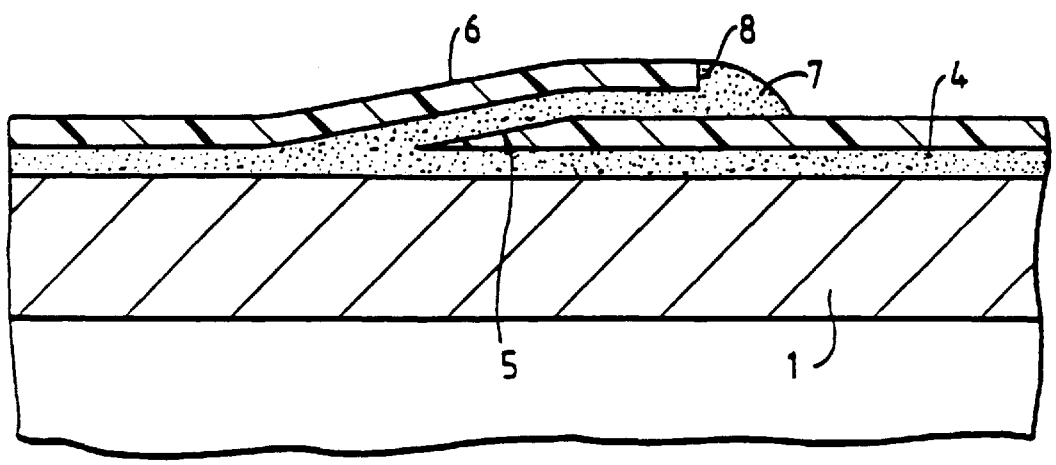
FIG. 5 shows in detail the overlap of FIG. 4 subsequent to heating the tape.

The overlap of FIG. 4 is shown in FIG. 5 subsequent to heating the tape. The adhesive 4 has melted and adhered to the outer surface of the pipe and some of the adhesive has exuded out of the overlap and has formed a fillet 7 adjacent to the abutment 8 of the overlapping portion of the tape. The adhesive layer of the overlapping portion 6 and the adhesive portion of the chamfered edge 5 have melted and fused together without leaving a void.

Figure 6:
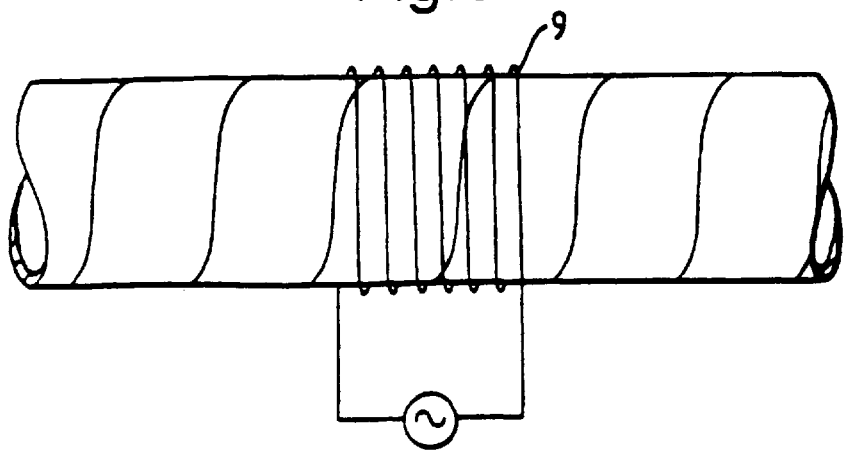
FIG. 6 is a schematic representation of the high frequency induction heating method according to the invention.

FIG. 6 is a schematic representation of the induction heating method according to the invention. A pipe helically wrapped in tape (which may be the tape of FIGS. 3 to 5) has an induction heater, represented by the coil 9, arranged around it. The induction heater is arranged to move along the pipe continuously heating sections of the pipe in order to melt the hot-melt adhesive of the tape.

What is claimed is:

1. A method of securing an article to a substrate, wherein the article comprises a heat-activatable composition, the method comprising
   (1) applying a curable polymeric composition to the substrate,
   (2) placing the article in thermal contact with the substrate so that the heat-activatable composition is placed in intimate contact with the curable polymeric composition, and
   (3) heating the substrate by applying a high frequency alternating magnetic field thereto, such that (a) skin effect induction heating of the substrate heats the heat-activatable composition and the curable polymeric composition is allowed to cure while it is in intimate contact with the heat-activatable composition so that the article is thereby secured to the substrate, and (b) the ratio of the thickness of the substrate to the skin depth is at least 25:1.

2. A method according to claim 1, wherein the article is placed in contact with the substrate such that the article substantially surrounds at least part of the substrate.

3. A method according to claim 2 wherein the article comprises a sleeve or tape.

4. A method according to claim 1, wherein the article comprises a backing layer for the heat-activatable composition.

5. A method according to claim 4 wherein the backing layer is heat-recoverable.

6. A method according to claim 1, wherein the substrate comprises a conduit.

7. A method according to claim 6 wherein fluid is flowing through the conduit.

8. A method according to claim 1, wherein the article comprises a tape which comprises at least one edge which is chamfered, the angle of chamfer being no greater than 25°.

9. A method according to claim 1 wherein the heat-activatable composition comprises a heat activatable adhesive.

10. A method according to claim 1 wherein the ratio is at least 40:1.

11. A method according to claim 10 wherein the ratio is at least 100:1.

* * * * *